(12) United States Patent
Blanchard et al.

(10) Patent No.: US 8,448,448 B2
(45) Date of Patent: May 28, 2013

(54) COOLING AIR BLEED DEVICE IN A TURBOMACHINE

(75) Inventors: Stephane Pierre Guillaume Blanchard, Chartrettes (FR); Mathieu Dakowski, Sucy en Brie (FR); Thomas Daris, Paris (FR); Romain Nicolas Lunel, Montereau sur le Jard (FR)

(73) Assignee: SNECMA, Paris (FR)

( * ) Notice: Subject to any disclaimer, the term of this patent is extended or adjusted under 35 U.S.C. 154(b) by 932 days.

(21) Appl. No.: 12/490,962

(22) Filed: Jun. 24, 2009

(65) Prior Publication Data

US 2009/0320498 A1 Dec. 31, 2009

(30) Foreign Application Priority Data

Jun. 25, 2008 (FR) ...................................... 08 03546

(51) Int. Cl.
*F02C 6/04* (2006.01)

(52) U.S. Cl.
USPC ................. 60/785; 60/231; 60/770; 137/855; 251/158; 251/148; 251/187

(58) Field of Classification Search
USPC ............ 60/770, 231, 266, 782, 785; 251/158, 251/298, 299, 300, 301, 302, 303, 187, 203, 251/204, 228, 251, 257, 148; 239/127.1, 239/265.39, 265.17; 137/855
See application file for complete search history.

(56) References Cited

U.S. PATENT DOCUMENTS

| | | | | | |
|---|---|---|---|---|---|
| 3,244,194 | A | * | 4/1966 | Henry | 137/460 |
| 3,539,150 | A | * | 11/1970 | Conrad | 251/228 |
| 3,672,630 | A | * | 6/1972 | Naumburg et al. | 251/149.2 |
| 3,875,921 | A | * | 4/1975 | Deboy et al. | 123/188.16 |
| 3,979,065 | A | * | 9/1976 | Madden | 239/127.3 |
| 4,000,612 | A | * | 1/1977 | Wakeman et al. | 60/230 |
| 4,203,286 | A | * | 5/1980 | Warburton | 60/266 |
| 5,255,849 | A | * | 10/1993 | Mayer et al. | 239/127.3 |
| 5,435,127 | A | * | 7/1995 | Luffy et al. | 60/204 |
| 5,775,589 | A | * | 7/1998 | Vdoviak et al. | 239/127.1 |
| 5,996,936 | A | * | 12/1999 | Mueller | 244/53 R |
| 6,021,637 | A | * | 2/2000 | Scavo | 60/262 |
| 6,089,537 | A | * | 7/2000 | Olmsted | 251/129.11 |

(Continued)

FOREIGN PATENT DOCUMENTS

| | | |
|---|---|---|
| EP | 1 522 680 A1 | 4/2005 |
| EP | 1 849 986 A1 | 10/2007 |
| GB | 2 376 515 A | 12/2002 |

OTHER PUBLICATIONS

U.S. Appl. No. 12/489,844, filed Jun. 23, 2009, Blanchard, et al.

(Continued)

*Primary Examiner* — William H Rodriguez
(74) *Attorney, Agent, or Firm* — Oblon, Spivak, McClelland, Maier & Neustadt, L.L.P.

(57) ABSTRACT

An air bleed device for cooling components in a turbine engine, including an annular conduit having a substantially rectangular cross-section formed in a housing and having a radially internal wall swept by an airflow is disclosed. The device includes an air inlet orifice, and a flap valve for controlling the airflow entering through the orifice, formed by a plate borne by a maneuvering member mobile in translation parallel to the axis of the orifice between a position in which the plate closes off the orifice and a position in which the plate opens the orifice.

16 Claims, 2 Drawing Sheets

U.S. PATENT DOCUMENTS

| | | | |
|---|---|---|---|
| 6,301,877 B1 * | 10/2001 | Liang et al. | 60/226.1 |
| 6,409,149 B1 * | 6/2002 | Maher, Jr. | 251/328 |
| 6,776,394 B2 * | 8/2004 | Lucas | 251/259 |
| 7,032,835 B2 * | 4/2006 | Murphy et al. | 239/128 |
| 7,204,472 B2 * | 4/2007 | Jones et al. | 251/129.06 |
| 7,213,393 B2 * | 5/2007 | Lapergue et al. | 60/266 |
| 7,296,397 B2 * | 11/2007 | Curtelin et al. | 60/232 |
| 7,762,526 B2 * | 7/2010 | Coleman et al. | 251/187 |
| 7,854,124 B2 * | 12/2010 | Sadil et al. | 60/771 |
| 8,141,366 B2 * | 3/2012 | Zamora et al. | 60/770 |
| 8,210,498 B2 * | 7/2012 | Blanchard et al. | 251/300 |
| 2004/0124392 A1 | 7/2004 | Lucas et al. | |
| 2005/0091964 A1 * | 5/2005 | Curtelin et al. | 60/262 |

OTHER PUBLICATIONS

U.S. Appl. No. 12/603,943, filed Oct. 22, 2009, Blanchard, et al.

* cited by examiner

COOLING AIR BLEED DEVICE IN A TURBOMACHINE

BACKGROUND OF THE INVENTION

1. Field of the Invention

This invention relates to a cooling air bleed device in a turbine engine, such as an airplane turbojet, which is intended in particular for cooling flaps of a convergent-divergent jet nozzle.

The jet nozzle of a turbojet generally comprises mobile flaps that are subjected to strong thermal stresses due to the passage of very hot gases coming from the combustion chamber of the turbomachine. These thermal stresses generate large amounts of infrared radiation capable of hindering the stealth of military aircraft and that should be minimized.

A solution consists of bleeding cold air in a secondary flow of the turbomachine, so as to direct it toward the flaps of the nozzle and cool them.

2. Description of the Related Art

The patent application EP 1 522 680 of the applicant describes a system for ventilating mobile flaps of a convergent-divergent nozzle of an airplane turbojet, which system includes an annular conduit supplied with cooling air through orifices provided in a wall separating the interior of the conduit from the downstream end of an annular passage surrounding a post-combustion chamber of the turbojet and in which a cooling airflow circulates. This ventilation system also includes air distribution cells distributed around the conduit and connected thereto, and telescopic channels each connecting a cell to a divergent nozzle seal located in the same plane of symmetry as the cell.

The disadvantage of this system is that it does not enable the bled airflow to be modulated.

This air bleed adversely affects the performance of the turbojet and is generally unnecessary in all phases of the aircraft flight.

BRIEF SUMMARY OF THE INVENTION

The invention is intended in particular to provide a simple, economical and effective solution to this problem, in particular enabling the airflow bled to be modulated at will in order to cool the nozzle.

It relates in particular to means for supplying cooling air in a turbomachine, located at a short distance upstream of the nozzle flaps, and which are capable of withstanding significant mechanical stresses generated by the thrust of gases in this location, and significant deformations of the nozzle due to high thermal stresses.

The invention also relates to means for supplying cooling air that are low profile and relatively lightweight, and that enable disturbances in the airflows flowing into the turbomachine to be limited, so as to optimize the performance of the turbine engine.

It also relates to cooling air supply means that are manually controlled by the airplane pilot.

The invention thus proposes a cooling air bleed device for cooling components in a turbomachine, including an annular conduit formed in a housing and having a radially internal portion that is swept by an airflow moving from upstream to downstream and that comprises at least one air inlet orifice with a radial axis, which device includes a flap valve for controlling the airflow entering through the orifice, and wherein the flap valve is formed by a plate held at its periphery by a maneuvering member outside the orifice and mobile in translation parallel to the axis of the orifice between a position in which the plate is applied on the edge of the orifice and closes off said orifice and a position in which the plate is moved away from the orifice and opens said orifice.

In the closing position, the plate is held against the edge of the orifice and closes the latter tightly under the pressure of the airflow.

The opening and closing of the plate result from a translation movement of the latter according to the axis of the orifice, thereby enabling the wear of its surface applied on the edge of the orifice in the closing position to be minimized, and therefore the lifetime of the device to be improved.

According to another feature of the invention, the airflow is guided toward the orifice of the conduit by an oblique wall attached to the housing by means forming a stop limiting the movement of the plate of the flap valve in the direction of opening of the orifice.

The oblique wall enables the movement of the airflow to be facilitated and the disturbances and head losses thereof to be limited, thereby enabling the performance of the turbomachine to be optimized.

The surface of the plate of the flap valve intended to be applied on the edge of the orifice advantageously comprises a seal, which preferably has a stainless steel sheet structure inserted between graphite layers or a graphite metal screen structure.

According to another feature of the invention, the maneuvering member includes a ring with a cylindrical internal threaded surface, cooperating with means formed in the housing for guiding the ring in translation and locking it in rotation, with an end of the ring being connected to an end of the plate of the flap valve.

The locking in rotation of the ring can enable the latter to be driven in translation by a screw-nut effect, as demonstrated below.

The means for locking the ring in rotation preferably include at least one lug or a longitudinal rib engaged in a longitudinal groove formed on the external surface of the ring.

Alternatively, the ring has an external polygonal cross-section and is housed in a cavity of the housing which extends parallel to the axis of the orifice and which has an internal cross-section substantially identical to the external cross-section of the ring in order to lock the ring in rotation.

According to another feature of the invention, the valve includes a toothed wheel for rotating a threaded rod screwed into the ring of the maneuvering member and held securely in translation by the housing.

The threaded rod cooperates with the internal threading of the ring in order to drive the ring in translation by a screw-nut effect. The aforementioned means for locking the ring in rotation participate in this screw-nut effect, by preventing the rotation of the ring and by guiding it according to a pure translation movement.

The toothed wheel is rotated by controlled means, including for example a flexible cable maneuvered by a cylinder.

The valve advantageously includes a disengageable connecting ring that is mounted coaxially and superimposed on the toothed wheel and secured in rotation with the threaded rod, and that comprises teeth with oblique flanks intended to cooperate by meshing with teeth having a conjugated shape formed at one end of the toothed wheel opposite the teeth of the connecting ring, and the valve also preferably includes resilient return means axially pushing the teeth of the toothed wheel engaged with those of the connecting ring.

During opening or closing of the flap valve, when the latter reaches the end of course against the means forming a stop or against the edge of the orifice, the connecting ring enables the rotation of the toothed wheel to be decoupled from that of the threaded rod, and therefore from the translation of the flap valve maneuvering member, so that the toothed wheel can optionally continue its rotation without risk of damaging the flap valve.

According to another feature of the invention, the air bleed device is installed on the housing of the turbine engine in order to cool control flaps of a jet nozzle, and it preferably includes a series of flap valves that are distributed uniformly around the axis of the turbomachine and a control actuator connected to the flap valves by synchronous drive means, such as, for example, a flexible cable or a ball cable, connected in series to the flap valves.

The flap valves of the air bleed device described above enable a simple movement of means for driving these valves to be converted into a movement of opening or closing of each of the flap valves, thereby enabling control of the device by a single simple drive means, which can moreover advantageously be chosen to be flexible, such as a ball cable, so that this device withstands deformations of the housing on which it is mounted and any mechanical stresses generated by the pressure of surrounding gases. The valves of the air bleed device according to the invention are capable of being used under these conditions, in particular temperature, which prohibit the use of electrical control valves, as is for example the case in the vicinity of a turbojet nozzle. These valves also have the advantage of having a low profile, and thus enabling the aerodynamic impact of the air bleed device on the flow of gases in the vicinity of the device to be limited. These valves are moreover uniformly distributed around the housing so as to enable uniform air bleed all around said housing.

The invention also relates to a turbine engine equipped with an air bleed device of the type described above.

BRIEF DESCRIPTION OF THE DRAWINGS

The invention will be easier to understand, and other details, advantages and features thereof will become clearer in view of the following description, provided by way of a non-limiting example, in reference to the appended drawings, in which.

DETAILED DESCRIPTION OF THE INVENTION

Figure 1:
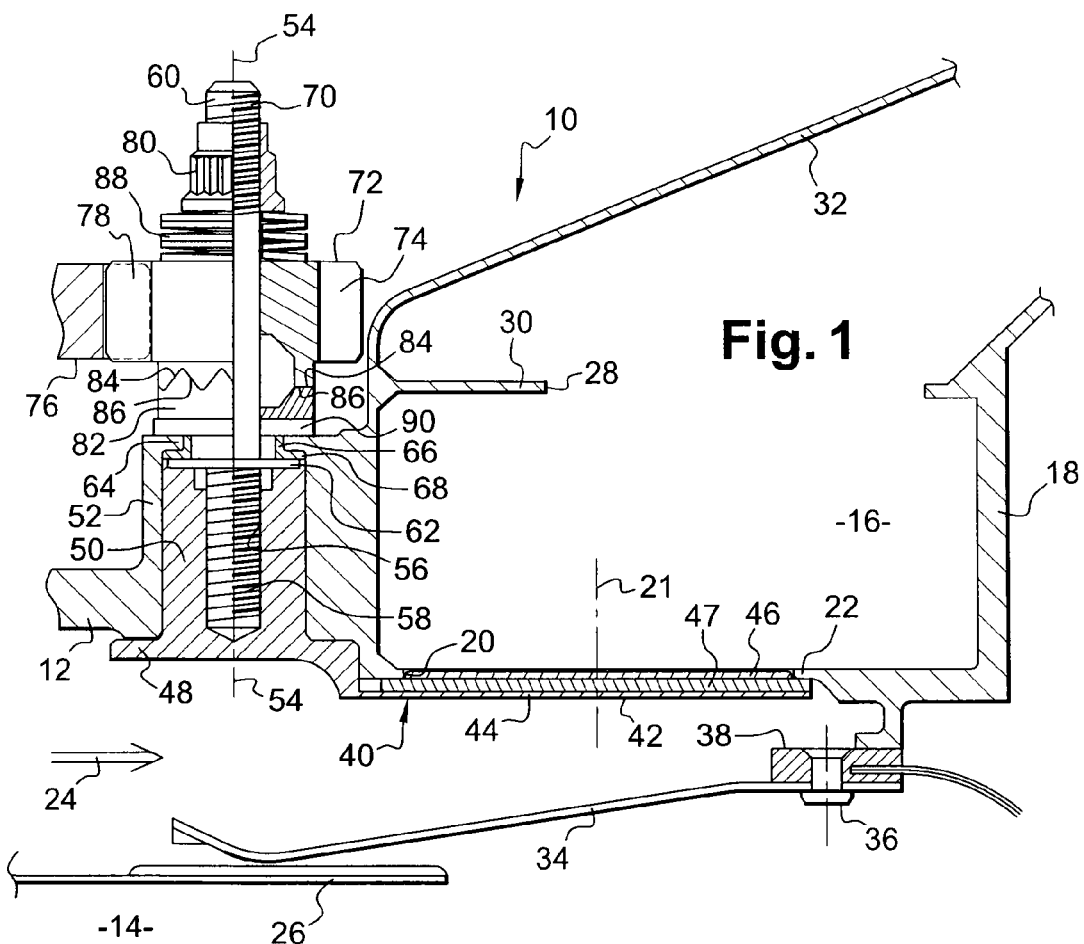
FIG. 1 is a partial diagrammatic view of an air bleed device according to the invention mounted on a turbojet nozzle with a closed flap valve; an upper left-hand portion of this figure is a frontal view while the remainder of the figure is a cross-section view according to a median axial plane of a valve of said device.

Reference is first made to FIG. 1, which shows a cooling air bleed device 10 mounted on the housing 12 of the afterbody of an airplane bypass turbojet comprising a post-combustion chamber 14, upstream of controlled flaps and nozzle seals of a jet nozzle, equivalent to the device described in document EP 1 522 680 cited above.

The device 10 includes an air circulation chamber 16 defined by a conduit 18 having a general annular shape and a rectangular axial cross-section, formed on the external surface of the housing. This conduit 18 includes orifices 20 with a radial axis 21 formed in its radially internal wall 22 and intended for bleeding cooling air onto a secondary cool airflow 24 moving from upstream to downstream around an annular wall 26 defining the post-combustion chamber, in which the conduit 18 also includes other orifices 28 formed in its radially external wall 30 and connected to means 32 for routing and diffusing the air over the nozzle flaps to be cooled, in which said means 32 can, for example, be of the type described in the aforementioned prior art document.

An annular wall 34 extends between the downstream end of the external wall 26 of the post-combustion chamber 14 and the radially internal wall 22 of the conduit 18. This wall 34 is attached by rivets 36 to an annular flange 38 formed at the downstream end of the radially internal wall 22 of the conduit, and divides the secondary cool air flow 24 into a radially external flow intended to supply the bleed device 10 in order to cool divergent flaps of the nozzle, and a radially internal flow intended to cool convergent flaps of said nozzle, as already described in the aforementioned prior art.

According to the invention, the radially internal wall 22 of the annular conduit 18 includes flat portions in which the aforementioned air inlet orifices 20 are formed, so that the latter are flat.

Figure 3:
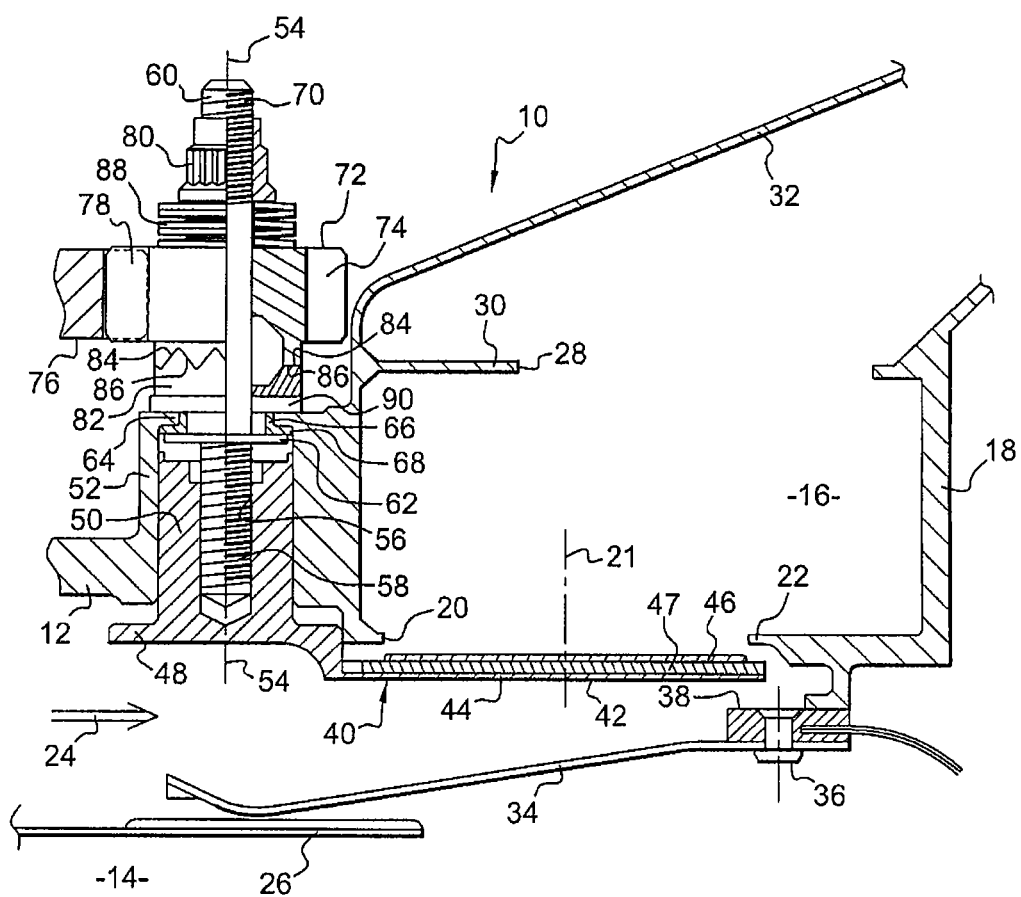
FIG. 3 is a partial diagrammatic view of an air bleed device according to the invention mounted on a turbojet nozzle with an open flap valve; an upper left-hand portion of this figure is a frontal view while the remainder of the figure is a cross-section view according to a median axial plane of a valve of said device.

To enable control of the cooling airflow bled, each air inlet orifice 20 is closed off by a flap valve 40, which includes means for driving a flapper 42 of the valve in translation according to the axis 21 of the orifice, between a position of opening shown in FIG. 3, and a position of closing the orifice 20 by said flapper 42 shown in FIG. 1, as described in greater detail below.

The flapper 42 includes an external circular disk 44 with a larger diameter, perpendicular to the axis 21 of the orifice and of which the periphery is intended to be applied against a seat or an edge of the orifice 20 in order to close off the latter, and an internal disk 46 with a smaller diameter formed on the external disk 44. The periphery of the external disk 44 intended to be applied against the edge of the orifice 20 is covered by a seal 47, made for example of a stainless steel sheet inserted between two graphite sheets, according to a structure sometimes called "Papiex". The seal can also be graphite with a metal screen.

The external disk 44 of the valve is secured at its periphery to a lug 48 forming the closed end of a ring 50 intended to maneuver the flapper 42 in order to open and close the orifice 20.

This ring 50 is housed, centered and guided in a path with a square internal cross-section 52 having an axis 54 substantially parallel to the axis 21 of the orifice 20 and formed on the external surface of the housing 12.

The ring 50 is mobile in translation according to the axis 54 and has a square external cross-section substantially conjugated with the internal cross-section of the vent 52.

At its end opposite the lug 48 of the flapper, the ring 50 comprises a cylindrical internal threaded channel 56 into which the threaded end 58 of a rod 60 rotationally mounted in the vent 52 is screwed.

The rod 60 comprises a circular collar 62 intended to enable it to be locked in translation parallel to the axis 21 of the orifice in the radially outward direction of the turbojet, i.e. toward the top of FIG. 1. For this, the vent 52 comprises, at its radially external end, a shoulder 64 of its internal surface against which the collar 62 abuts.

The locking of the rod 60 in translation radially inwardly with respect to the turbojet is ensure by rotating members mounted on a portion of the rod outside the vent 52, as will be demonstrated more clearly below.

To facilitate the guiding of the rod 60 in rotation, a sleeve 66 with a cylindrical internal cross-section is mounted around the rod 60 so as to be interposed between the rod and the shoulder 64 of the vent 52. The sleeve 66 has a square external cross-section conjugated with the internal cross-section of the shoulder 64 of the vent, and comprises a collar 68 with a square external cross-section conjugated with the internal cross-section of the vent, with said collar 68 being interposed between the collar 62 of the rod and the shoulder 64 of the vent.

The collar 62 of the rod 60 divides the latter into a first threaded portion 58 extending into the vent 52 and screwed into the internal channel 56 of the ring 50, and a second portion 70 extending outside of the vent 52 and bearing a toothed wheel 72 for driving in rotation.

The toothed wheel 72 has radial teeth 74 intended to be engaged with suitable drive means 76, of which an example will be described in greater detail below, and which are shown diagrammatically in FIG. 1 by teeth 78 cooperating by meshing with the teeth 74 of the toothed wheel 72. This toothed wheel is also held on the rod 60 by a nut 80 screwed at the end of the latter.

The valve 40 advantageously includes a disengageable connecting ring 82 coaxial to and superimposed on the toothed wheel 72, and comprising teeth with oblique flanks 84 intended to cooperate by meshing with teeth 86 having a conjugated shape formed at one end of the toothed wheel 72 opposite the teeth 84 of the connecting ring 82.

Resiliently deformable washers 88, such as wave or frustoconical washers, for example numbering three, are interposed between the toothed wheel 72 and its retaining nut 80 on the rod 60, in order to axially push the teeth with oblique flanks 86 of the toothed wheel 72 against the teeth 84 of the connecting ring 82 and thus cause the toothed wheel to be rotationally secured with the connecting ring.

The connecting ring 82 includes splines (not visible in FIG. 1) extending radially over its internal face and cooperating with splines (also not visible) with a substantially conjugated shape formed on the second portion 70 of the rod 60 in order to transmit to said rod the rotating movement of the connecting ring 82, and therefore that of the toothed wheel 72. Alternatively, the connecting ring 82 can be welded to the second portion 70 of the rod 60.

To facilitate the rotation of the connecting ring 82 and prevent the wear thereof as well as the wear of the external surface of the vent 52, a metal washer 90 or a resilient material is interposed between the radially internal face of the connecting ring and the edge of the orifice of the vent 52. The washer 90 also opposes the translation of the rod 60 radially inwardly with respect to the turbojet.

The device according to the invention works as follows: with the valve 40 initially in its closure position shown in FIG. 1, it is simply necessary, in order to cause the opening of the orifice 20 and the entrance of cool air into the conduit 18, to rotate the toothed wheel 72 in the direction of unscrewing of the threaded portion 58 of the rod 60 from the internal channel 56 of the ring 50, owing to suitable drive means 76.

In consideration of the locking in rotation of the ring 50 and the locking in translation of the rod 60 radially outwardly with respect to the turbojet, the rotation of the rod 60 in the direction of unscrewing of its threaded portion 58 drives a translation of the ring 50 toward the interior of the turbojet parallel to the axis 21 of the orifice 20. The ring 50 drives with it the flapper 42 to which it is secured, until the downstream end of said flapper abuts against the radially external surface of the annular flange 38.

In the opening position of the orifice 20, the annular wall 34 ensures the guiding of the air toward the interior 16 of the conduit 18.

The closing of the orifice 20 by the flapper 42 is performed by rotating the toothed wheel 72 in the direction of screwing of the threaded portion 58 of the rod 60 in the internal channel 56 of the ring 50, until the seal 47 of the flapper is applied against the edge of the orifice 20.

In a maneuver of the flapper 42 caused by the rotation of the toothed wheel 72, the disengageable connecting ring 82 transmits the rotation of the toothed wheel 72 to the rod 60.

When the flapper 42 reaches its closing position in contact with the edge of the orifice 20 or when it reaches its maximum opening position in which its downstream end abuts against the annular flange 38, the ring 50 can no longer move in translation.

The connecting ring 82 then enables the rotation of the toothed wheel 72 to be decoupled from that of the rod 60, if the toothed wheel 72 continues to be driven in rotation by the drive means 76. Indeed, the locking in translation of the ring 50 prevents the rotation of the rod 60 and therefore of the connecting ring 82, which is secured in rotation with said rod 60. The force exerted by the rotational drive means 76 of the toothed wheel 72 is then converted into an axial force oriented radially outwardly by the respective teeth with oblique flanks 84 and 86 of the connecting ring and the toothed wheel, which force tends to move the toothed wheel 72 away from the connecting ring 82 while causing a compression of the resiliently deformable washers 88.

The disengageable connecting ring 82 thus enables the risks of damage of the air bleed device 10 to be minimized if the toothed wheel 72 is driven beyond the limits of the course of the flapper 42 or the ring 50, and thus prevents the need for sophisticated control means for controlling the drive means 76 of the toothed wheel 72.

To prevent the flapper 42 or its lug 48 for connection to the ring 50 from being subjected to excessive mechanical stresses when the orifice is closed, and to prevent the rod 60 from being moved in translation radially inwardly with respect to the turbojet, causing compression of the resiliently deformable washers 88 by the nut 80, in the closing position, it is preferable for the ring 50 to have an axial range such that, when the flapper is in the closing position, the open end of said ring abuts against the shoulder 64 of the internal surface of the vent 52 and/or against the collar 62 of the rod 60, as in FIG. 1. This also enables any clearance at the opening of the orifice to be prevented.

In addition, the external cross-section of the ring 50 and the internal cross-section of the vent 52 may be not square but rectangular, or more generally polygonal, so as to enable the ring 50 to be locked in rotation.

Alternatively, the ring 50 and the vent 52 can be cylindrical, and the locking in rotation of the ring 50 is in this case ensured by a rib/groove cooperation between the ring 50 and the vent 52. For example, the internal surface of the vent 52 can comprise a rib extending according to the axis 54 of the vent and engaged in a groove with a conjugated shape formed on the external surface of the ring 50 in order to prevent the rotation of the latter.

Figure 2:
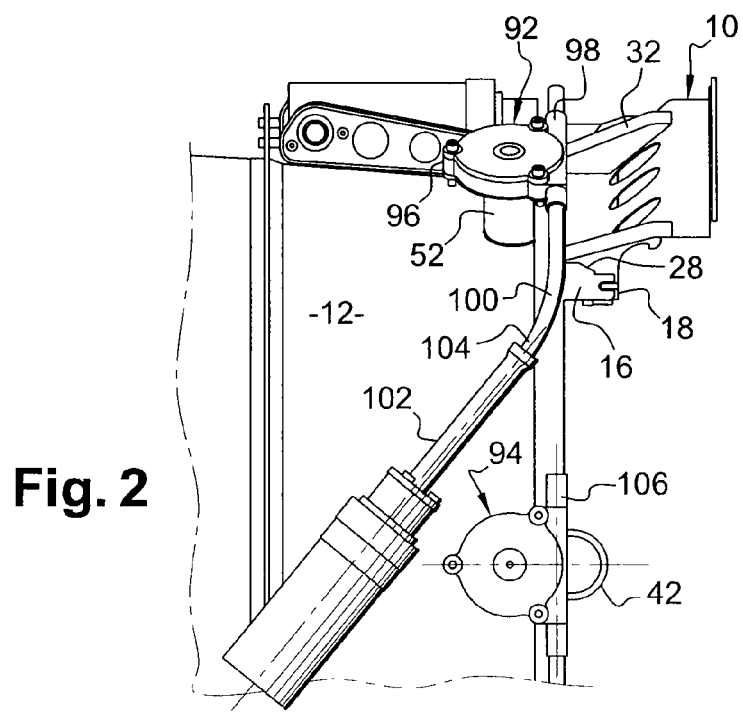
FIG. 2 is a partial diagrammatic cross-section in perspective of the jet nozzle equipped with the air bleed device of FIG. 1.

FIG. 2 shows an overview of the cooling air bleed device 10 described above, and more specifically shows two valves 92 and 94 of this device and means for controlling these valves. The toothed wheel of each valve of the device is protected by a cylindrical fairing 96 comprising a rectilinear aperture 98 for the passage of a drive member, such as a flexible cable or a ball cable 100 in order to drive the toothed wheel. The cable 100 is actuated by a cylinder 102 mounted on the housing 12 of the nozzle and connected to an end 104 of the cable, with the other end 106 of said cable 100 being free at the outlet of the last valve 94 controlled by said cable.

The air bleed device 10 according to the invention provides the possibility of controlling all of the valves distributed around the nozzle in a synchronized manner by means of a single control actuator, in order to cool the controlled turbojet nozzle flaps, in which the control of this device can be performed manually by the airplane pilot.

The use of a flexible cable 100 in order to transmit the control movement of the actuator 102 to the toothed wheels 72 of the valves enables the system to withstand deformations of the housing 12 on which it is mounted while resisting the mechanical and thermal stresses generated by the flow of gases around said system.

In addition, such a cable 100 does not have to be in a closed circuit, and its end opposite the control cylinder 102 can remain free as already mentioned, thereby allowing for an advantageous weight gain.

The invention claimed is:

1. A cooling air bleed device for cooling components in a turbomachine, including an annular conduit formed in a housing and having a radially internal portion that is swept by an airflow moving from upstream to downstream and that comprises at least one air inlet orifice with a radial axis, the device comprising:
    a flap valve formed by a plate, for controlling the airflow entering through the at least one air inlet orifice, wherein the flap valve plate is held at its periphery by a maneuvering member outside the at least one air inlet orifice, and mobile in translation parallel to an axis of the at least one air inlet orifice between a position in which the flap valve plate is applied on an edge of the at least one air inlet orifice and closes off said at least one air inlet orifice, and a position in which the flap valve plate is moved away from the at least one air inlet orifice and opens said at least one air inlet orifice.

2. The cooling air bleed device according to claim 1, wherein the airflow is guided toward the at least one air inlet orifice of the conduit by an oblique wall attached to the housing by a stop which limits the movement of the flap valve plate in the direction of opening of the orifice.

3. The cooling air bleed device according to claim 1, wherein the at least one air inlet orifice is flat.

4. The cooling air bleed device according to claim 1, wherein the surface of the flap valve plate applied on the edge of the at least one air inlet orifice comprises a seal.

5. The cooling air bleed device according to claim 4, wherein the seal has a stainless steel sheet structure inserted between graphite layers or a graphite metal screen structure.

6. The cooling air bleed device according to claim 1, wherein the maneuvering member includes a ring with a cylindrical internal threaded surface, cooperating with means formed in the housing for guiding the ring in translation and locking the ring in rotation, with an end of the ring being connected to an end of the flap valve plate.

7. The cooling air bleed device according to claim 6, wherein the means for locking the ring in rotation include at least one lug or a longitudinal rib engaged in a longitudinal groove formed on the external surface of the ring.

8. The cooling air bleed device according to claim 6, wherein the ring has an external polygonal cross-section and is housed in a cavity of the housing which extends parallel to the axis of the orifice and which has an internal cross-section substantially identical to the external cross-section of the ring in order to lock the ring in rotation.

9. The cooling air bleed device according to claim 6, wherein the valve includes a toothed wheel for rotating a threaded rod screwed into the ring of the maneuvering member and held securely in translation by the housing.

10. The cooling air bleed device according to claim 9, wherein the valve includes a disengageable connecting ring that is mounted coaxially and superimposed on the toothed wheel and secured in rotation with the threaded rod, and that comprises teeth with oblique flanks which cooperate by meshing with teeth having a conjugated shape formed at one end of the toothed wheel opposite the teeth of the connecting ring.

11. The cooling air bleed device according to claim 10, wherein the valve includes resilient return means axially pushing the teeth of the toothed wheel engaged with the teeth of the connecting ring.

12. The cooling air bleed device according to claim 1, wherein said device is installed on a housing of the turbomachine in order to cool at least one controlled flap of a jet nozzle.

13. The cooling air bleed device according to claim 12, including a series of flap valves that are distributed uniformly around an axis of the turbomachine.

14. The cooling air bleed device according to claim 12, including a control actuator connected to the flap valves by synchronous drive means.

15. A turbomachine, including a cooling air bleed device according to claim 1.

16. The cooling air bleed device according to claim 14, wherein the synchronous drive means is a flexible cable or a ball cable, connected in series to the flap valves.

\* \* \* \* \*